United States Patent
Skipworth et al.

[11] Patent Number: 5,962,814
[45] Date of Patent: Oct. 5, 1999

[54] WIRE HARNESS TROUGH WITH PIVOTING GUIDE

[75] Inventors: Richard Humes Skipworth, Plymouth; Raymond Paul Ernst, Jr., Canton; Steven Loyd Willis, Belleville, all of Mich.

[73] Assignee: Yazaki Corporation, Tokyo, Japan

[21] Appl. No.: 08/949,594

[22] Filed: Oct. 14, 1997

[51] Int. Cl.$^6$ ............................... H01B 7/06; H01B 7/24; F16L 3/01
[52] U.S. Cl. ........................... 174/135; 174/136; 248/49; 248/73
[58] Field of Search ..................... 174/135, 136, 174/72 A, 72 C, 72 R, 138 G, 79, 65 R, 92, 84 R; 439/447, 448, 449; 248/49, 73

[56] References Cited

U.S. PATENT DOCUMENTS

| | | | |
|---|---|---|---|
| 4,241,965 | 12/1980 | Wilson et al. ............................. | 439/31 |
| 4,363,459 | 12/1982 | Holzer ..................................... | 248/265 |
| 4,508,307 | 4/1985 | Morales ................................... | 248/460 |
| 5,106,040 | 4/1992 | Cafmeyer et al. ........................ | 248/73 |
| 5,280,138 | 1/1994 | Preston et al. ........................... | 174/152 |
| 5,401,905 | 3/1995 | Lesser et al. ............................. | 174/99 |
| 5,556,059 | 9/1996 | Maeda et al. ............................. | 248/49 |
| 5,684,274 | 11/1997 | McLeod ................................... | 174/92 |
| 5,739,470 | 4/1998 | Takeda ..................................... | 174/97 |

FOREIGN PATENT DOCUMENTS

| | | |
|---|---|---|
| 62-15579 | of 1987 | Japan . |
| 257217 | of 1990 | Japan . |

*Primary Examiner*—Kristine Kincaid
*Assistant Examiner*—Mark E. Olds
*Attorney, Agent, or Firm*—Young & Basile, P.C.

[57] ABSTRACT

A wire harness protector having a hinged guide for controlling movement of the wire harness adjacent the protector. The protector is an open-ended trough with a hinged, latchable cover and fasteners for securing the trough to a moving surface, such as a vehicle trunk lid. The guide is hinged to an end of the trough, with a free end enabling it to swing relative to the trough. A central slot extends along a length of the guide, sized to receive a standard clip head strapped to the wire harness in a fixed position on the harness. When the surface to which the trough is secured moves, the wire harness slides relative to the trough. The clip head travels along the slot and the guide pivots relative to the end of the trough, controlling both sliding and bending movement of the wire harness.

14 Claims, 3 Drawing Sheets

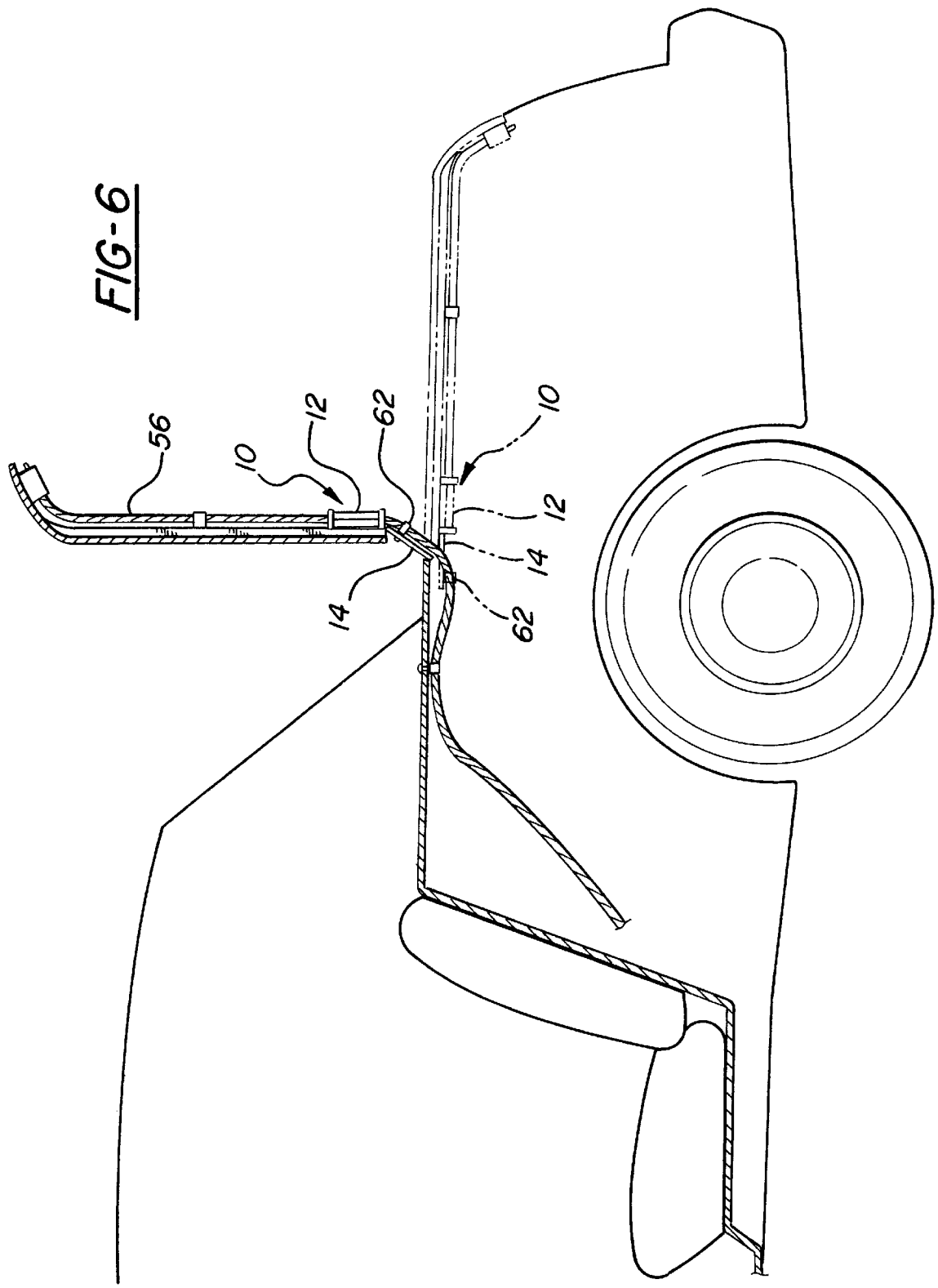

WIRE HARNESS TROUGH WITH PIVOTING GUIDE

FIELD OF THE INVENTION

This invention relates in general to wire harness protectors and more particularly to a trough-type protector through which the harness slides.

DISCUSSION OF RELATED ART

Wire harnesses for powering electrical components in automotive vehicles are usually fastened to vehicle body panels along the route to the components, for example with studs or clips. But in some locations, such as on car doors and trunk lids, the wire harness must be allowed limited movement to prevent damage when the door or lid is opened or closed. This entails providing some slack in the harness and means for controlling that slack to prevent its being caught and damaged.

Taking a trunk lid example, rigid, arcuate, bracket-type hinges for the trunk lid have long provided a mounting point and route for the wire harness as it bridged the gap between trunk compartment and lid. These old style hinges also limited the amount of slack needed in the harness on the way to components such as trunk-mounted brake lights and automatic trunk latches. However, new leaf spring style trunk hinges have eliminated the convenient mounting "bridge" provided by the old style, and have increased the required amount of wire harness slack considerably.

Prior wire harness protectors are known which include troughs for enclosing the harness. Anchoring a wire harness trough so the trough does not rotate is known, as disclosed for example by Japanese Utility Model Publication No. 62-15579 (1987) and U.S. Pat. No. 5,401,905. The Japanese document also discloses using a sliding bracket between the wire harness protector and its mount which allows sliding movement between the protector and mount when the wire harness is pushed or pulled.

Japanese Utility Model Publication 2-57217 (1990) discloses a wire harness shield which, by employing an adjustable panel-mounting fastener, allows for a variable mounting orientation. The device includes wire harness taping sections extending from the shield. The fastener itself is also taped to the shield after it has been oriented at the desired angle.

U.S. Pat. No. 5,106,040 shows a wire harness mounted for sliding movement relative to a steering wheel column. The wire harness is taped to an L-shaped carrier which has a slide pin. The slide pin is received on a track in a bracket secured to the steering column. The wire harness is able to move relative to the bracket to respond to both axial and tilt adjustment of the steering wheel without damage to the wire harness.

Whether the wire harness is mounted to a sliding bracket or taped to a fixed trough, in some environments the slack portion of the harness may be required to bend at a point near the protector when the mounting surface (door, trunk lid, steering wheel column, etc.) moves. Unless this movement is controlled and guided around threats such as hinges, closing doors, and sharp edges, damage to the wire harness may occur.

SUMMARY OF THE INVENTION

Accordingly, it is an object of this invention to guide a wire harness in a specific direction on a moving surface to eliminate the possibility of wire harness damage from stretching, bunching, pinching, abrasion, and tearing.

Another object of this invention is to substantially enclose the wire harness in a covered trough while still allowing the harness to move freely.

A further object of this invention is to constrain and control the movement of the wire harness near the covered trough while providing routing flexibility to the harness.

In general the above objects are achieved with a trough type wire harness protector secured to a moving surface on the vehicle (door, trunk lid, etc.) such that the portion of the slack in the wire harness is enclosed by and slides freely through the trough as the door, trunk lid, etc is opened and closed. To help control a portion of the slack which increases in length when the door or trunk lid is closed, the trough includes an integral hinged guide extending from one end of the trough along the harness, the wire harness being secured to the guide with a sliding fastener such as a clip. The hinged guide is rigid and although hinged, its sliding connection to the wire harness serves to control the movement of the downstream slack in the wire harness when the door or trunk lid is closed.

In carrying out this invention in an illustrative embodiment thereof, the wire harness protector is a tubular trough with two open ends. Multiple fasteners extend from the underside to secure the trough to a movable surface, such as a vehicle door or trunk lid, so the trough cannot move relative to the surface. The trough is preferably split in two, with a half-tubular cover connected to the trough by a hinge. Latches on the cover mate with projections on the trough to lock the cover in a closed position covering the trough and providing a tubular protector. The hinged guide extends from one open end of the trough. The guide preferably takes the form of an elongated flat tab or arm integrally connected to one end of the trough by a living hinge, with a free end which swings or pivots relative to the trough. The guide in a preferred form also includes a longitudinal slot extending along its length, with a width sized to securely receive a standard clip head or similar sliding fastener fixed to the wire harness.

In operation, a wire harness is enclosed in the protector trough to slide through each open end. A slide fastener such as a clip is attached to a portion of the wire harness adjacent but outside the trough, and a head of the clip is inserted through the slot in the clip guide. The trough is fastened to a moveable surface, for example a vehicle trunk lid. When the trunk lid opens, the wire harness slides through and within the trough, and the clip head travels along the guide slot as the hinged guide pivots relative to the trough. The sliding motion and bending of the downstream slack in the wire harness relative to the protector and trunk lid is guided and controlled by the hinged guide to keep the harness slack out of harm's way.

This invention, together with other objects, features, aspects and advantages thereof, will be more clearly understood from the following description, considered with the accompanying drawings.

BRIEF DESCRIPTION OF THE DRAWINGS

FIG. 6 is a side view of the vehicle trunk mounting arrangement of FIG. 5.

COMPLETE DESCRIPTION OF THE PREFERRED EMBODIMENT

Figure 1:
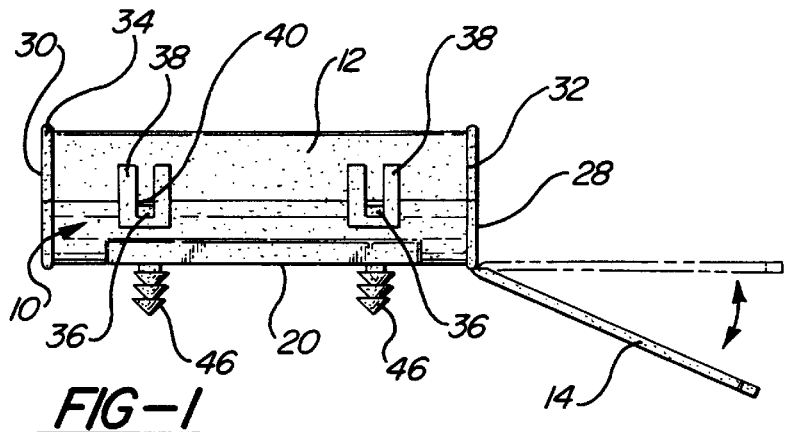
FIG. 1 is a side view of a wire harness protector according to the invention, with a tubular trough, latchable cover and hinged clip guide.

Referring first to FIG. 1, the illustrated example of the present invention consists primarily of a tubular wire harness trough 10 with a cover 12, and a pivotable wire harness guide 14 hinged to one end of the trough. The parts are molded from plastic as one piece. As illustrated in the FIG. 2 end view, the trough 10 and cover 12 are both half-tubular. The trough 10 has upper edges 16 and 18 and an underside 20. The cover 12 has lower edges 22 and 24 mating with the trough's upper edges.

Figure 2:
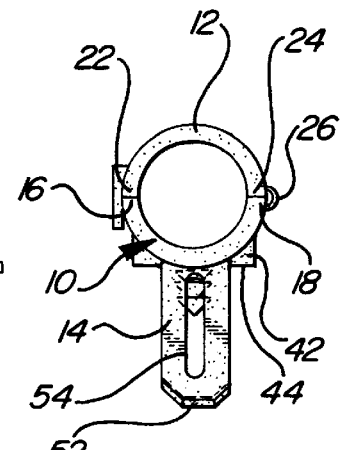
FIG. 2 is an end view of the protector of FIG. 1.
Figure 3:
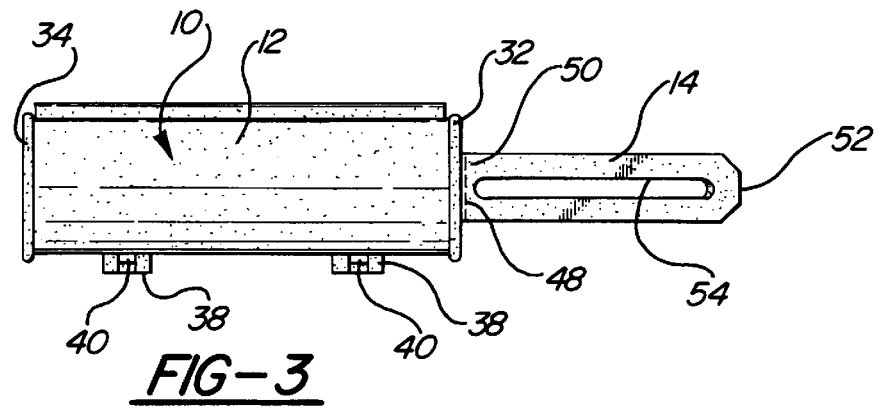
FIG. 3 is a top view of the protector.

Cover 12 is joined to trough 10 by a hinge 26 at edges 18 and 24. Hinge 26 is shown as a living hinge molded integrally with the cover and trough, but it can comprise any type of conventional hinge. A living hinge is a strip of material integral with the trough and cover but much narrower in cross-section than both the trough and cover at their mating edges 18 and 24. Hinge 26 accordingly bends or flexes as the cover is opened and closed. In the closed position, as best shown in FIG. 2, the upper and lower edges of the cover and trough abut one another with a smooth, flush interior seam.

When the cover is closed, the cover and trough form a tubular protector with open ends 28 and 30. Ends 28 and 30 formed by the cover and trough have raised, rounded rims 32 and 34, respectively, to prevent a wire harness sliding through the protector from being snagged or damaged by the ends of the protector.

The illustrated trough has lock projections 36 near edge 16. The illustrated cover has U-shaped latch arms 38 on its exterior adjacent edge 22. The latch arms 38 each have an aperture 40 which receives a lock projection 36 when the latch arms are snapped over the lock projections as the cover is closed on the trough. It will be understood by those skilled in the art that other types of conventional locking structure can be used in place of the illustrated latch arm and lock projection example.

Figure 4:
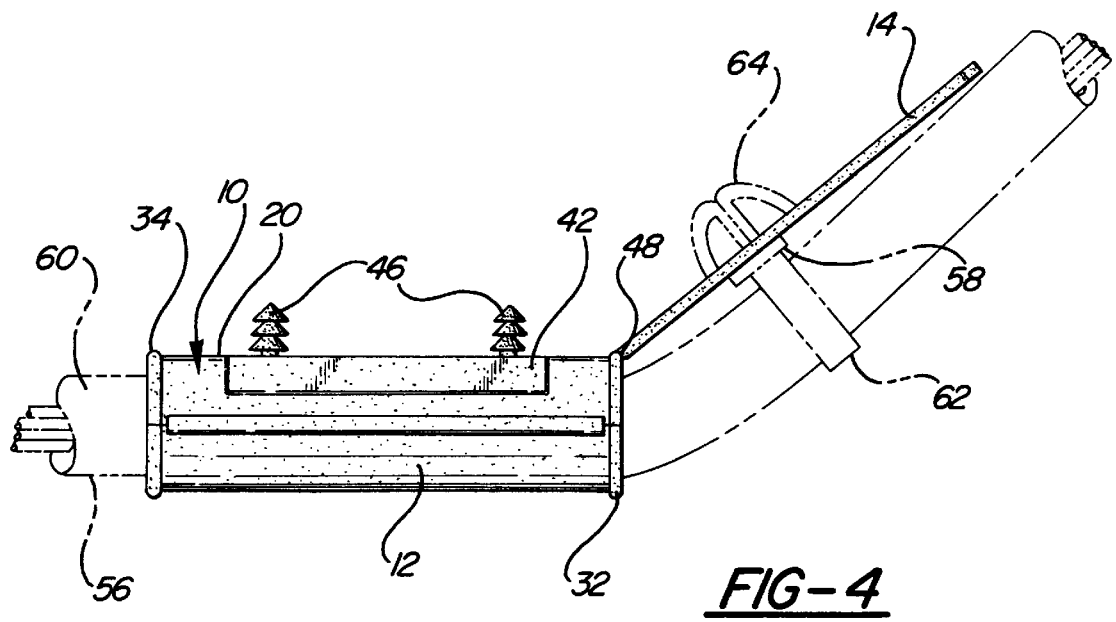
FIG. 4 is an illustration of the protector in use with a wire harness.

The underside 20 of trough 10 has a partially rectangular integral base 42. Base 42 presents a flat mating surface 44 for stable contact against the panel or wall on which the protector is mounted. Base 42 also includes fasteners 46 extending from the flat bottom 44 to secure the protector to a mounting surface such as a panel or wall. Fasteners 46 are designed to be received in holes in the panel or wall to secure the protector to the surface. Fasteners 46 can be Christmas-tree type fasteners as shown in FIGS. 1 and 4, or some other type of conventional fastener. Each fastener is near an end of the trough to prevent the trough from rotating relative to the mounting surface.

The hinged wire harness guide 14 is attached to the rounded rim 32 at end 28 of trough 10 adjacent the underside 20 of the trough. Guide 14 is a flat elongated tab or arm attached to rim 32 by a living hinge 48. Although as an alternative some other type of conventional hinge may be used, an integrally molded living hinge is preferred. Guide 14 pivots up and down relative to the open end of the trough as shown by the arrow and broken lines. Guide 14 may be oval or rectangular. A long, central slot 54 extends along the length of the guide between its ends 50 and 52.

FIG. 4 illustrates the protector of FIG. 1 with a wire harness 56 and standard clip 58. The wire harness 56 comprises bundled wires, usually wrapped in known fashion with tape or encased in plastic conduit. Clip 58 includes a tie strap 62 wrapped around the wire harness to fix the clip in position on the wire harness, and a clip head 64 integral with or attached to the strap. The clip head is flexible plastic, and when used in typical fashion to secure the wire harness to a vehicle body panel, is deformed or compressed when it is inserted through a hole in the panel, whereupon it expands to its original, undeformed state and cannot easily be pulled back out. But in the present invention the portion of the wire harness near the panel-mounted protector must be able to move relative to the panel, so clip 58 is used for a different purpose.

Clip 58 is mounted in the slot 54 in the hinged wire harness guide 14 to allow the wire harness to slide relative to trough 10 while guide 14 controls harness orientation and movement. The combination slide/pivot action of guide 14 on the wire harness also enables routing flexibility as the harness exits the trough. To these ends, the wire harness is placed in the trough 10 and clip head 64 is inserted through slot 54 in guide 14, securing the clip to the guide. Cover 12 is closed to hold the wire harness in the trough. Fasteners 46 extending from base 42 on underside 20 of the trough are inserted into holes in a vehicle body panel such as a trunk lid. When the lid is opened or closed the slack portion of the wire harness slides in the trough. Clip 58 travels along slot 54 on guide 14, guiding the wire harness directionally in its sliding movement, while the rigid guide pivots relative to the trough, controlling the bending motion of the harness slack.

Figure 5:
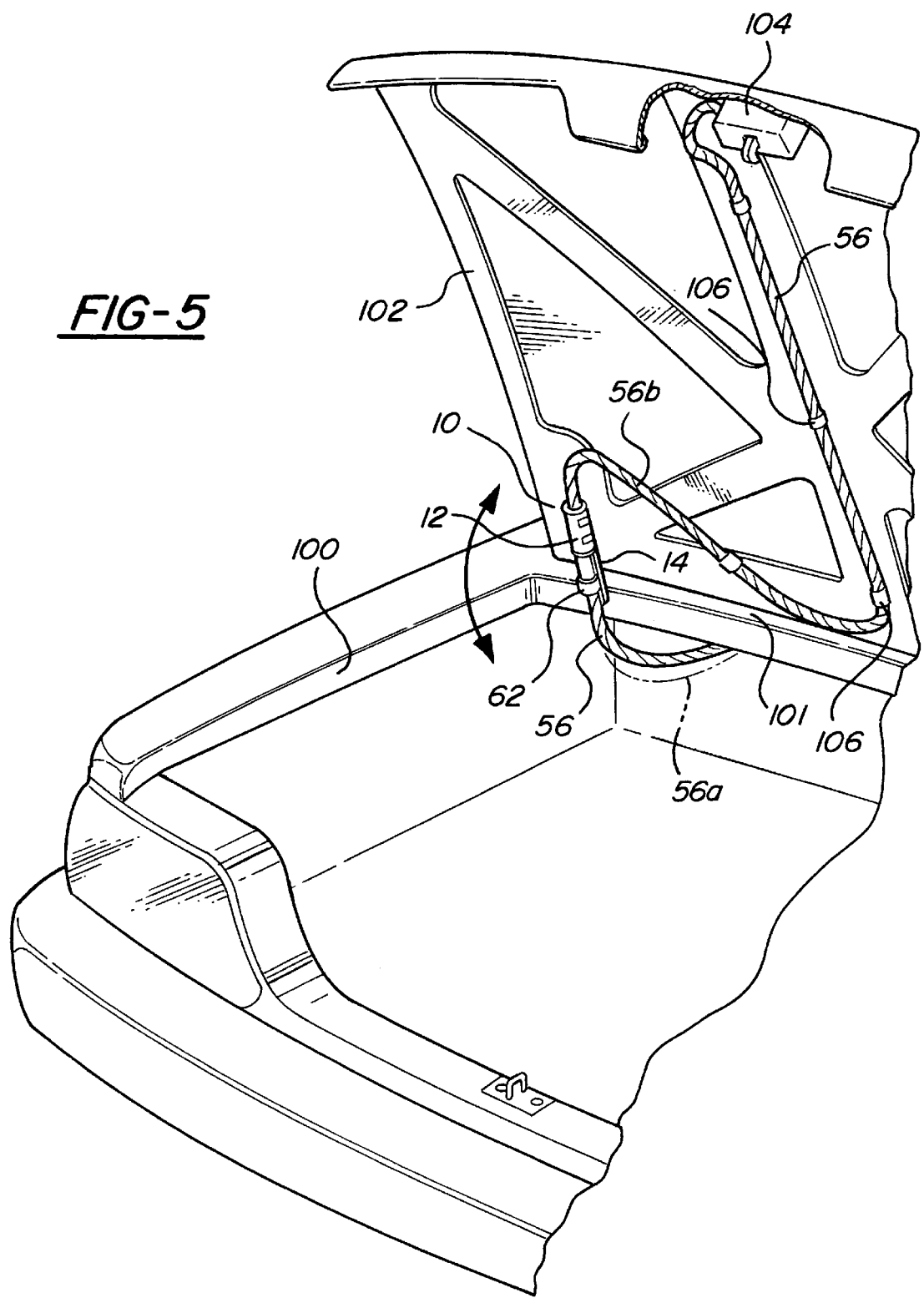
FIG. 5 is a perspective view of a vehicle trunk with a wire harness protector according to the present invention.

Referring now to FIGS. 5 and 6, the above-described wire harness protector is illustrated in one possible application on the vehicle, namely in routing the wire harness cable from the trunk to the trunk lid and an automatic lock mechanism located on the rear center of the trunk. Some of the newer styled trunk hinges on automobiles do not provide a satisfactory mounting point or routing pathway for the portion of the wire harness traversing the gap between the trunk and the lid. For example, newer leaf spring style hinges require more slack in the wire harness than previous styles. This slack must be allowed to move with the trunk lid, but must simultaneously be shaped, directed and controlled in its movement to prevent its becoming caught between the lid and trunk or hanging loosely and interfering with the loading and unloading of luggage from the trunk.

In FIGS. 5 and 6, an incoming or upstream end 56a of wire harness 56 is fixed to a point on the vehicle body by a retainer clip or other known structure. The harness then proceeds aft into the trunk, across the gap or hinge 101 between trunk 100 and trunk lid 102, and then across the trunk lid and rearwardly to automatic lock mechanism 104 on the rear center of the truck lid. The wire harness protector 10 according to the present invention is securely fixed to the left forward corner of the trunk lid with its Christmas tree-type fasteners inserted in suitable mounting holes in the trunk lid. The protector is oriented with the hinged clip guide facing forwardly relative to the automobile, i.e., to receive the incoming wire harness from a point forwardly on the vehicle.

Although the wire harness is securely fixed to the vehicle body and trunk lid at a number of points 106 with suitable clips or other retaining structure, a slack "downstream" portion 56b of the wire harness must be left free to move in the vicinity of the trunk hinge to accommodate the opening and closing of the trunk lid without unduly tearing, stretching or pulling the wire harness. At the same time, slack portion 56b must be controlled so that it does not drop down into the trunk compartment or get caught between the trunk lid and the trunk. As can be seen by comparing the slack portion 56b of the wire harness shown in both solid lines (trunk open) and broken lines (trunk closed) in FIG. 6, the tubular sliding trough and integral hinged clip guide of the invention allow the wire harness slack to slide freely as the trunk opens and closes, while the rigid, pivoting clip guide keeps the wire harness out of the gap between the trunk lid and trunk. The placement of the hinged wire harness guide across the gap of the two moving vehicle panels, its pivoting nature, and its sliding connection to the wire harness make the inventive trough and clip guide applicable to virtually any pivoting or hinged surface on the vehicle, for example doors, steering wheel columns, hoods, and any others across which a wire harness may need to be routed.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A wire harness protector comprising:

a trough having first and second open ends, the trough being adapted to be mounted on a moving surface and to receive and enclose a wire harness in a sliding fit; and a hinged wire harness guide extending from the first end of the trough, the hinged wire harness guide designed to receive a fastener attached to a portion of the wire harness in a sliding connection to guide a sliding and bending movement of the wire harness adjacent the trough.

2. A wire harness protector as defined in claim 1 wherein the hinged guide is connected to the trough with a living hinge.

3. A wire harness protector as defined in claim 1 wherein the hinged guide has a lengthwise slot for slidably accommodating a clip secured to said wire harness.

4. A wire harness protector as defined in claim 1 wherein the hinged guide comprises a rigid, elongated arm having an end of said elongated arm attached to the trough with a hinge.

5. A wire harness protector as defined in claim 1 wherein the trough is tubular in shape and the first end of the trough has a rounded rim.

6. A wire harness protector as defined in claim 5 wherein the hinged guide is connected to the rounded rim.

7. A wire harness protector as defined in claim 5 wherein the second end of the trough also has a rounded rim.

8. A wire harness protector as defined in claim 1 wherein the trough comprises a lower trough portion and a cover secured to said lower trough portion, the cover being movable between an open position providing access to the interior of the trough and a closed position covering the trough to enclose a wire harness therein.

9. A wire harness protector as defined in claim 8 wherein the cover is secured to the trough by a hinge.

10. A wire harness protector as defined in claim 9 wherein the hinge securing the cover to the trough is a living hinge.

11. A wire harness protector as defined in claim 10, further including means on the cover and the lower trough portion for releasably latching the cover in the closed position.

12. A wire harness protector as defined in claim 8 wherein the lower trough portion, the cover and the hinged guide are molded as one piece.

13. A wire harness protector as defined in claim 1 further comprising at least one fastener on the trough for fastening the trough to a mounting surface.

14. A wire harness protector as defined in claim 13 wherein there are multiple fasteners on the trough to prevent rotation of the trough relative to the mounting surface.

* * * * *